(12) United States Patent
Starkweather

(10) Patent No.: US 6,856,445 B2
(45) Date of Patent: Feb. 15, 2005

(54) RASTERING ARRAYS OF MEMS OPTICAL DISPLAY SYSTEMS

(75) Inventor: Gary K. Starkweather, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 10/603,390

(22) Filed: Jun. 24, 2003

(65) Prior Publication Data

US 2004/0263943 A1 Dec. 30, 2004

(51) Int. Cl.$^7$ ............................................. G02B 26/00
(52) U.S. Cl. ........................................ 359/290; 359/201
(58) Field of Search .............................. 359/290, 198, 359/223, 201

(56) References Cited

U.S. PATENT DOCUMENTS 5,612,736 A * 3/1997 Vogeley et al. ........ 348/207.99

FOREIGN PATENT DOCUMENTS

EP        1289273 A1 * 3/2003    ............ H04N/3/08

* cited by examiner

Primary Examiner—Scott J. Sugarman
Assistant Examiner—Richard Hanig
(74) Attorney, Agent, or Firm—Woodcock Washburn LLP

(57) ABSTRACT

A microelectrical mechanical system (MEMS) optical raster display system includes a microelectrical mechanical system (MEMS) device that supports a reflective surface and tilts it in first and second transverse directions. The reflective surface is positioned to receive modulated light from a light source and to direct reflected light toward an image surface, such as a display screen, in a raster scan pattern. The raster scanning of the light is coordinated with the modulation of the light to form a display image on the display screen. In one implementation, the system includes multiple modulated light sources that each direct modulated light toward the reflective surface. The light sources are positioned so that the reflective surface reflects modulated light from each light source to a separate region of the display screen, thereby forming plural contiguous, generally non-overlapping, raster scan patterns.

16 Claims, 4 Drawing Sheets

RASTERING ARRAYS OF MEMS OPTICAL DISPLAY SYSTEMS

TECHNICAL FIELD

The present invention relates to optical display systems and, in particular, to a microelectrical mechanical system (MEMS) optical raster display system.

BACKGROUND AND SUMMARY

Raster scanning is a long-standing display technique in which a beam is scanned across a display screen to impart a display image. Conventionally, an electron beam in a cathode-ray tube is scanned across a phosphor screen, as in standard television sets and computer display monitors. The pixels of an image are rendered sequentially as the electron beam is scanned across the display screen.

Development has since emphasized various pixelated panel displays in which a panel is formed with multiple pixels, as in a liquid crystal cell. The multiple pixels, or significant groups of the multiple pixels, are rendered substantially simultaneously rather than completely sequentially as in a raster display. Various liquid crystal technologies have been developed. Recently an integrated circuit pixelated reflective display has been developed and is called the digital micromirror device, which is available from Texas Instruments Incorporated.

As is known in the art, the digital micromirror device includes an array of micromechanical mirrors that are formed as part of a structure that is manufactured in accordance with integrated circuit manufacturing processes. Each micromechanical mirror corresponds to one pixel in the display. The digital micromirror device imparts display information on light by controllably tipping each of the micromechanical mirrors to control the amount of light that is reflected from the mirror to a display screen.

With the increasing sophistication and cost of pixelated panel displays, interest has returned to raster scanning. But rather than being used within a cathode ray tube, optical displays are being developed to use raster scanning of a light beam over a display screen. The display screen may be reflective, transparent, or translucent, according to the relative positioning of the light source and the viewer or viewers. The light intensity is modulated in coordination with the raster-scanning of the light beam to impart a display image over the surface of the display screen.

In some instances, microelectrical mechanical system (MEMS) actuators have been applied to raster scanning of light to form an optical display. MEMS actuators provide control of very small components that are formed on semiconductor substrates by conventional semiconductor (e.g., CMOS) fabrication processes. MEMS systems and actuators are sometimes referred to as micromachined systems-on-a-chip.

Examples of such actuators are described in U.S. Pat. No. 6,422,011 for Thermal Out-of-Plane Buckle Beam Actuator and US Patent Application Publication No. 2002-0088224 for Resonant Thermal Out-of-Plane Buckle-Beam Actuator, both assigned to Microsoft Corporation. In these examples, one or more MEMS actuators support one or more mirrors that controllably reflect light to form a raster scan on a display screen. The intensity of the light source is modulated and the micromechanical device functions to raster scan the modulated light over the display.

An aspect of the present invention is an appreciation that raster scanning of a display by a relatively small-scale MEMS device can be constrained by structural limitations of the MEMS device, thereby limiting the scope and range of the raster scan pattern. In a pixelated reflective display such as is provided by digital micromirror devices, the limited motion of the micromechanical devices is adequate to impart the modulation of the light intensity of a single pixel.

The present invention includes, therefore, a microelectrical mechanical system (MEMS) optical raster display system. The system includes a microelectrical mechanical system (MEMS) device that supports a reflective surface and tilts it in first and second transverse directions. The reflective surface is positioned to receive modulated light from a light source and to direct reflected light toward an image surface, such as a display screen, in a raster scan pattern. The raster scanning of the light is coordinated with the modulation of the light to form a display image on the display screen.

In one implementation, the system includes multiple modulated light sources that each direct modulated light toward the reflective surface. The light sources are positioned so that the reflective surface reflects modulated light from each light source to a separate region of the display screen, thereby forming plural contiguous, generally non-overlapping, raster scan patterns.

The raster scanning of multiple light beams allows one reflective surface and MEMS device to render a larger display area than could be rendered with only one light beam. As a result, the cost of implementing such an optical raster display is correspondingly reduced.

Additional objects and advantages of the present invention will be apparent from the detailed description of the preferred embodiment thereof, which proceeds with reference to the accompanying drawings.

DETAILED DESCRIPTION OF PREFERRED EMBODIMENTS

Figure 1:
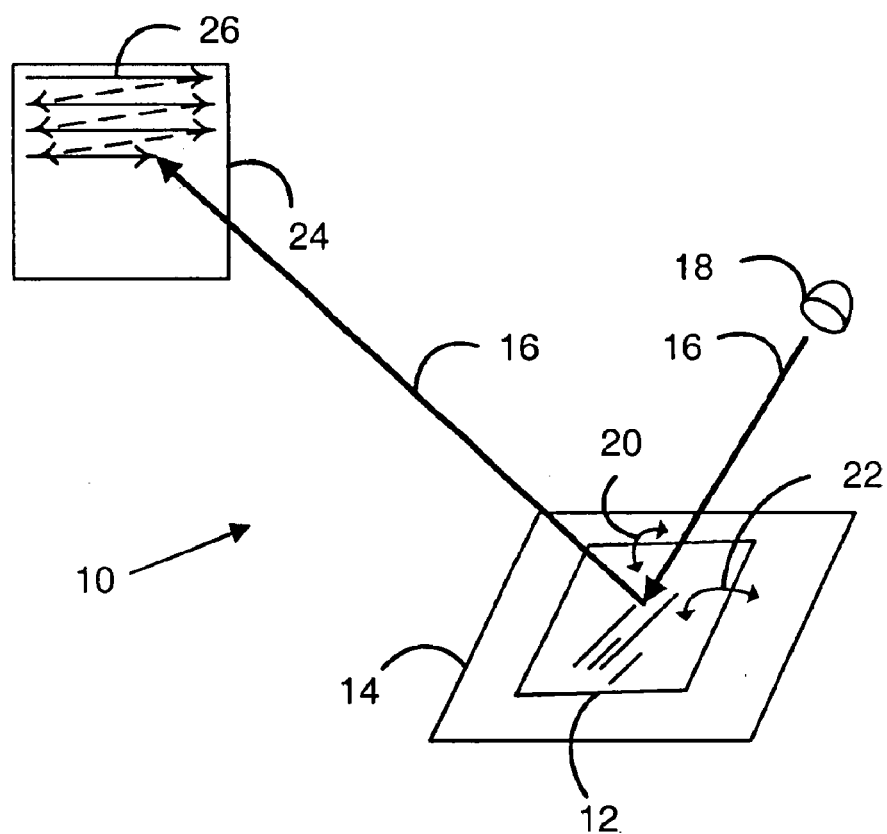
FIG. 1 is a diagrammatic illustration of a microelectrical mechanical system (MEMS) raster optical display system operated with a single light beam.

FIG. 1 is a diagrammatic illustration of microelectrical mechanical system (MEMS) optical raster display system 10 having a reflective surface 12 on a MEMS device 14. Illumination light 16 from a light source 18 is directed toward reflective surface 12. MEMS device 14 tilts, pivots, or oscillates reflective surface 12 in two transverse directions 20 and 22 to reflect illumination light 16 toward an image surface, such as a display screen 24.

The pivoting or tilting in transverse directions 20 and 22 cooperates with positioning of light source 18 to direct light across display screen 24 in a raster scan pattern 26. The light from light source is modulated, either by modulating light source 18 or by modulating the light with a separate light valve (not shown), to impart image information on the light.

As a result, the raster scanning of the light over display screen 24, together with the modulation of illumination light 16, forms a display image on display screen 24.

It will be appreciated that the display image may be formed on surfaces other than a display screen, such as on another optical surface (e.g., lens), an electronic surface (e.g., camera input), etc. This would allow the display image to be used in other applications, such as a projection display. In addition, display system 10 may provide scanning (e.g., two-dimensional) of illumination light 16 in patterns other than raster scan pattern 26.

In one illustrative implementation, MEMS raster display system 10 is capable of imparting to reflective surface 12 a tilt or pivot of about 3 degrees (i.e., +1.5 degrees) in each of transverse directions 20 and 22. As a result, the effective scan angle is doubled to about 6 degrees upon reflection of illumination light 16. Transverse directions 20 and 22 may correspond to the respective horizontal (x) and vertical (y) components of raster scan pattern 26, for example.

With a scan range of 6 degrees in each direction 20 and 22, light may be reflected from reflective surface 12 over scan space of about 36 square (solid) degrees, or about 0.1% of the available scan volume. For a conventional scan rate of 60 frames/second (i.e., 60 Hz in a slow-scan, or Y-direction), a fast scan rate of 3,000 Hz in an X-direction would provide for raster scan pattern 26 an array of 50×50 pixels. Such scan rates are compatible with available MEMS devices 14.

Modulation of light source 18 in coordination with the raster scanning of illumination light 16 allows a 50×50 pixel display image to be imparted on display screen 24. As another illustration, a display image of 100×100 pixels can be achieved with a maximum scan rate is 6,000 Hz or 6 KHz, which may also be achievable with some MEMS devices 14 with reflective surfaces 12.

In one implementation, light source 18 may include a vertical cavity laser or "VCSELS," which can provide low cost and high performance. These and other solid state light sources are capable of megahertz frequencies, as well as analog intensity control, thereby having sufficient bandwidth capabilities for adequate gray scales.

Figure 2:
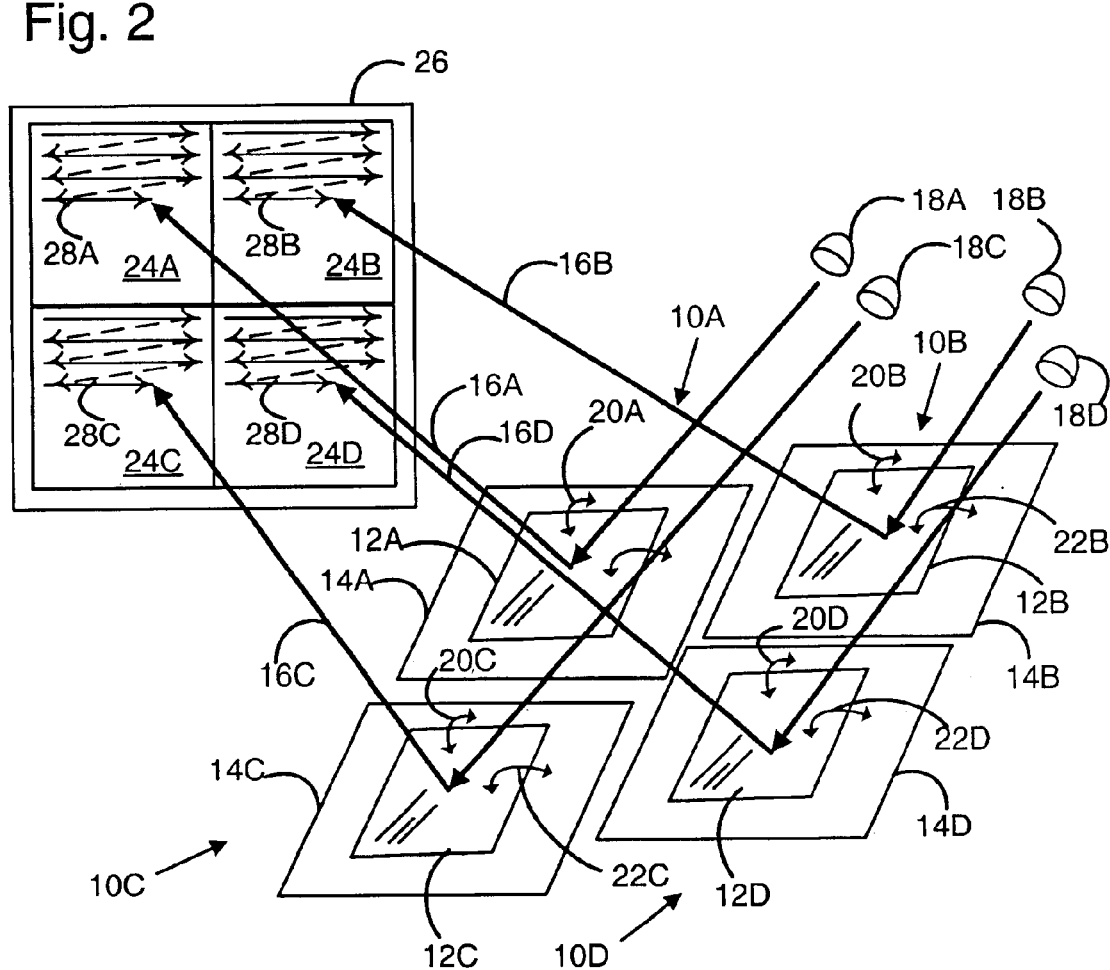
FIG. 2 is a diagrammatic illustration of multiple microelectrical mechanical system (MEMS) raster optical display systems forming adjacent raster scan patterns.

MEMS raster display system 10 illustrates use of a MEMS device 14 to provide raster scanning to form a display image. Limits on the angular extent at which some MEMS devices 14 can be tilted or pivoted can restrict the number of pixels that can be addressed at video rates (i.e., 60 Hz). One way to provide a display with pixel dimensions greater than can be provided by MEMS raster display system 10 alone is to employ an array 30 of MEMS raster display systems 10, as illustrated in FIG. 2. MEMS device 14 may be of any type that provides tilting or pivoting action at sufficient frequencies, such as the thermal actuators described in U.S. Pat. No. 6,422,011 or US Patent Application Publication No. 2002-0088224.

FIG. 2 is a diagrammatic illustration of multiple (e.g., four) microelectrical mechanical system (MEMS) optical raster display systems 10A–10D that have reflective surfaces 12A–12D on MEMS devices 14A–14D, respectively. Illumination light 16A–16D from light sources 18A–18D is directed toward reflective surfaces 12A–12D, respectively. MEMS devices 14A–14D pivot or oscillate reflective surfaces 12A–12D in respective transverse directions 20A–20D and 22A–22D to reflect illumination light 16A–16D toward display screen regions 24A–24D, respectively. The pivoting or oscillation in transverse directions 20 and 22 cooperate to direct light source 18 across display screen 26 in multiple raster scan patterns 28A–28D.

Modulation of light sources 18A–18D in coordination with the raster scanning of illumination lights 16A–16D allows four 50×50 pixel raster scan patterns 28A–28D to be imparted on display screen 26. The raster-scanned image components are abutted or contiguous to provide a larger display (e.g., 200×200 pixels) than could be provided by a comparable MEMS raster display system 10 alone, as shown in FIG. 1.

Figure 3:
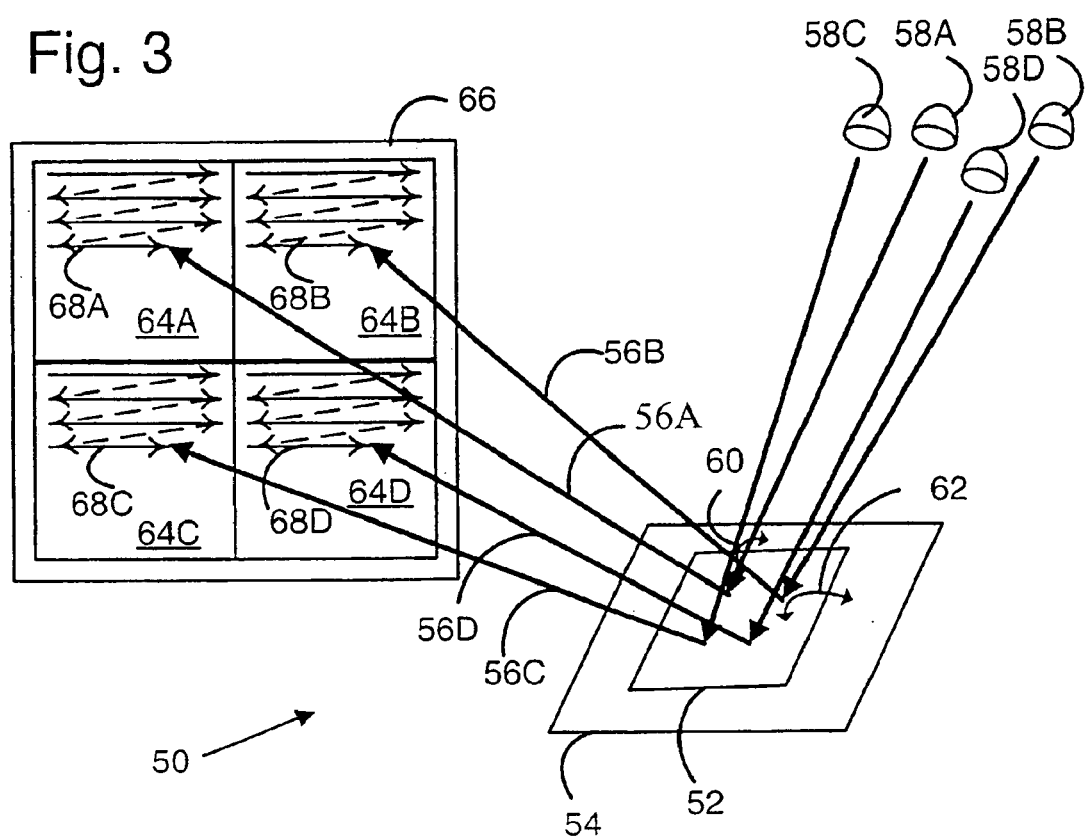
FIG. 3 is a diagrammatic illustration of a microelectrical mechanical system (MEMS) raster optical display system operated with multiple light beams to form adjacent raster scan patterns.

FIG. 3 is a diagrammatic illustration of a Raster Arrays of MEMS Optical Display Systems (RAMODS) implementation in which a microelectrical mechanical system (MEMS) raster display system 50 has a reflective surface 52 on a MEMS device 54. Multiple illumination lights 56A–56D from light sources 58A–58D are directed toward reflective surfaces 52. MEMS device 54 pivots, tilts, or oscillates reflective surfaces 52 in two transverse directions 60 and 62 to reflect illumination lights 56A–56D toward display screen regions 64A–64D, respectively. The pivoting or oscillation in transverse directions 60 and 62 cooperate to direct illumination lights 56A–56D across display screen 66 in raster scan patterns 68A–68D.

Modulation of light sources 58A–58D in coordination with the raster scanning of illumination lights 56A–56D allows four 50×50 pixel raster scan patterns 68A–68D to be rendered on display screen 66. The raster-scanned image components are abutted to or contiguous with each other to provide a larger display (e.g., 100×100 pixels) than could be provided by a comparable MEMS raster display system 10 employing only one light beam 16 (FIG. 1).

Figure 4:
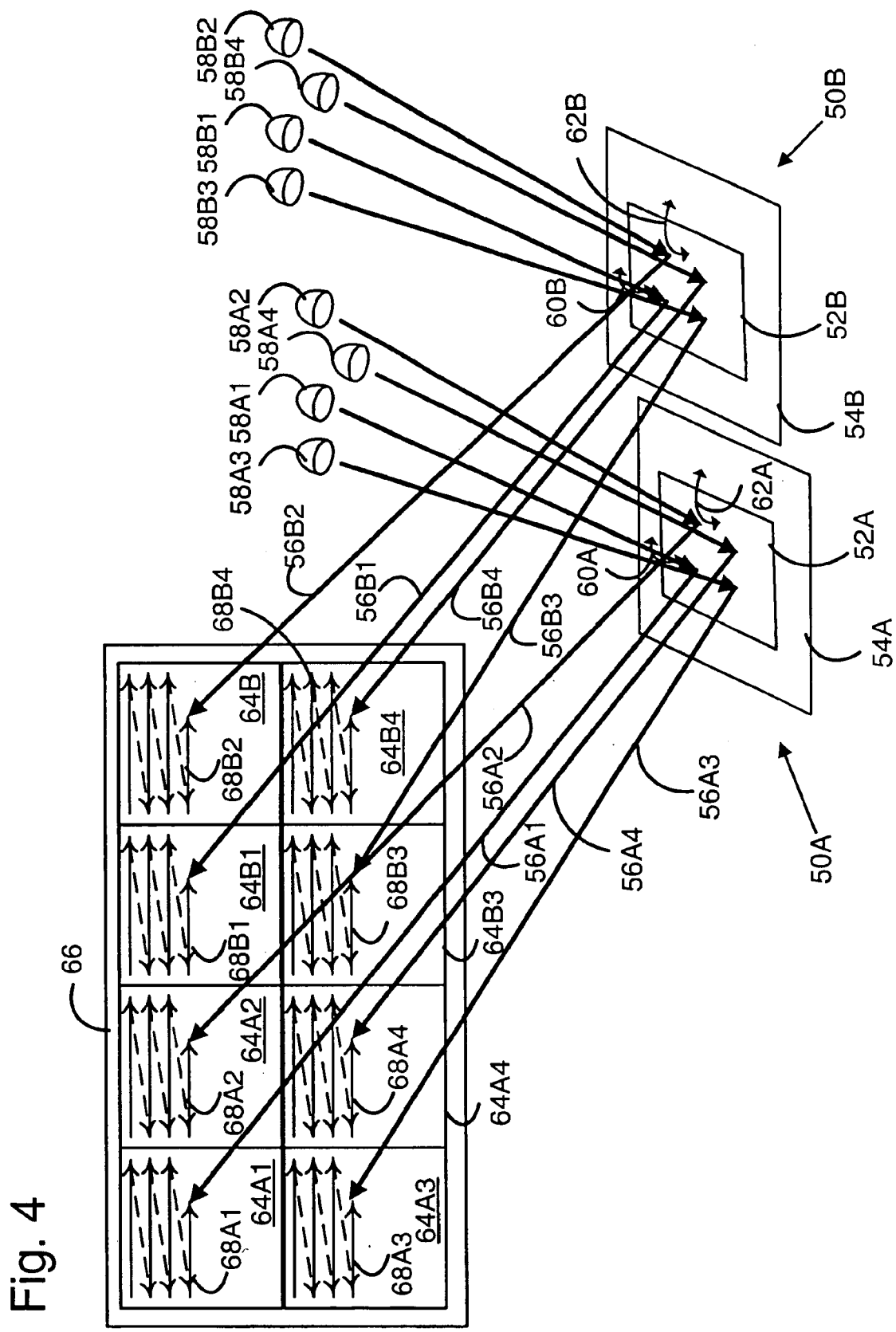
FIG. 4 is a diagrammatic illustration of multiple microelectrical mechanical system (MEMS) raster optical display systems operated with multiple light beams to form adjacent raster scan patterns.

FIG. 4 is a diagrammatic illustration of a Raster Arrays of MEMS Optical Display Systems (RAMODS) implementation in which multiple microelectrical mechanical system (MEMS) raster display systems 50A, 50B have reflective surfaces 52A, 52B on MEMS devices 54A, 54B, respectively. Multiple illumination lights 56A1–56A4 and 56B1–56B4 from light sources 58A1–58A4 and 58B1–58B4 are directed toward reflective surfaces 52A, 52B.

MEMS devices 54A, 54B pivot, tilt, or oscillate reflective surfaces 52A, 52B in respective transverse directions 60A, 60B and 62A, 62B to reflect illumination lights 56A1–56A4 and 56B1–56B4 toward display regions 64A1–64A4 and 64B1–64B4, respectively. The pivoting or oscillation in transverse directions 60A, 60B and 62A, 62B cooperate to direct lights 56A1–56A4 and 56B1–56B4 across display screen 66 in raster scan patterns 68A1–68A4 and 68B1–68B4.

Modulation of light sources 58A1–58A4 and 58B1–58B4 in coordination with the raster scanning of illumination lights 56A1–56A4 and 56B1∫56B4 allows eight 50×50 pixel raster scan patterns 68A1–68A4 and 68B1–68B4 to be rendered on display screen 66. The raster-scanned image components are displayed contiguously to provide a larger display (e.g., 100×100 pixels) than could be provided by a comparable MEMS raster display system 50 alone (FIG. 3).

It will be appreciated that arbitrary numbers of MEMS raster display systems 10 and 50 can be used together to form display images from arbitrary numbers raster scan patterns 26 and 68. Likewise, the number of light sources 58 that can be directed to a reflective surface 52 of MEMS raster display system 50 is also arbitrary within practical limits.

Practical limits to the degree of multiplicity may based on a number of factors including the actual MEMS chip available, the scan angles and mirror sizes available to achieve the desired pixel count, the wavelength of light being used, etc. This invention, however, permits generating 4, 6 and even more rasters from a MEMS reflective surface (mirror) having even a limited scan angle, such as the 3 physical degrees discussed above.

Having described and illustrated the principles of our invention with reference to an illustrated embodiment, it will be recognized that the illustrated embodiment can be modified in arrangement and detail without departing from such principles. In view of the many possible embodiments to which the principles of our invention may be applied, it should be recognized that the detailed embodiments are illustrative only and should not be taken as limiting the scope of our invention. Rather, we claim as my invention all such embodiments as may come within the scope and spirit of the following claims and equivalents thereto.

What is claimed is:

1. A microelectrical mechanical system (MEMS) raster optical display system, comprising:

an image surface;

a modulated light source;

a microelectrical mechanical system (MEMS) device that supports a reflective surface and tilts the reflective surface in first and second transverse directions, the reflective surface being positioned to receive modulated light from the light source and to direct reflected light toward the image surface in a raster scan pattern in coordination with modulation of the light source; and plural modulated light sources that each direct modulated light toward the reflective surface, the plural light sources being positioned so that the reflective surface reflects modulated light from each of the plural light sources to a separate region of the image surface, thereby to form plural contiguous, generally non-overlapping, raster scan patterns on the image surface.

2. The system of claim 1 further comprising:

plural microelectrical mechanical system (MEMS) devices, each supporting a reflective surface and tilting it in first and second transverse directions;

plural modulated light sources positioned to direct modulated light to each reflective surface to be reflected therefrom each to a separate region of the image surface, thereby to form plural contiguous, generally non-overlapping, raster scan patterns on the image surface.

3. The system of claim 1 in which each raster scan pattern encompasses a display region of 100 pixels-by-100 pixels, or less.

4. The system of claim 1 in which each raster scan pattern encompasses a display region of about 50 pixels-by-50 pixels.

5. The system of claim 1 further comprising:

plural microelectrical mechanical system (MEMS) devices, each supporting a reflective surface and tilting it in first and second transverse directions;

plural modulated light sources, each positioned to direct modulated light to a separate reflective surface to be reflected therefrom to a separate region of the image surface, thereby to form plural contiguous, generally non-overlapping, raster scan patterns on the image surface.

6. The system of claim 1 in which the raster scan pattern encompasses a display region of 100 pixels-by-100 pixels, or less.

7. The system of claim 1 in which the raster scan pattern encompasses a display region of about 50 pixels-by-50 pixels.

8. The system of claim 1 in which the image surface is a display screen.

9. The system of claim 1 in which the microelectrical mechanical system (MEMS) device includes a thermally-activated actuator.

10. A microelectrical mechanical system (MEMS) raster optical display method, comprising:

directing modulated light toward a reflective surface supported on a microelectrical mechanical system (MEMS) device;

tilting the reflective surface in first and second transverse directions with the microelectrical mechanical system (MEMS) device in first and second transverse directions to reflect the modulated light toward an image surface in a raster scan pattern; and directing plural separately modulated lights toward the reflective surface, wherein tilting of the reflective surface in first and second transverse directions reflects the separately modulated lights to separate regions of the image surface to form plural contiguous, generally non-overlapping, raster scan patterns on the image surface.

11. The method of claim 10 in which each raster scan pattern encompasses a display region of 100 pixels-by-100 pixels, or less.

12. The system of claim 10 in which each raster scan pattern encompasses a display region of about 50 pixels-by-50 pixels.

13. The method of claim 10 in which the image surface is a display screen.

14. A microelectrical mechanical system (MEMS) raster optical display system, comprising:

a display surface;

a modulated light source;

a microelectrical mechanical system (MEMS) device that supports a reflective surface and tilts the reflective surface in first and second transverse directions, the reflective surface being positioned to receive modulated light from the light source and to direct reflected light toward the display surface in a two-dimensional scan pattern in coordination with modulation of the light source; and plural modulated light sources that each direct modulated light toward the reflective surface, the plural light sources being positioned so that the reflective surface reflects modulated light from each of the plural light sources to a separate region of the display surface, thereby to form plural contiguous, generally non-overlapping, two-dimensional scan patterns on the display surface.

15. The system of claim 14 further comprising:

plural microelectrical mechanical system (MEMS) devices, each supporting a reflective surface and tilting it in first and second transverse directions;

plural modulated light sources positioned to direct modulated light to each reflective surface to be reflected therefrom each to a separate region of the display surface, thereby to form plural contiguous, generally non-overlapping, two-dimensional scan patterns on the image surface.

16. The system of claim 14 further comprising:

plural microelectrical mechanical system (MEMS) devices, each supporting a reflective surface and tilting it in first and second transverse directions;

plural modulated light sources, each positioned to direct modulated light to a separate reflective surface to be reflected therefrom to a separate region of the display surface, thereby to form plural contiguous, generally non-overlapping, two-dimensional scan patterns on the display surface.

* * * * *